Sept. 18, 1956  J. M. WALLACE ET AL  2,763,815
CIRCUIT INTERRUPTER FOR LOAD PICKUP OPERATION
Filed Dec. 8, 1951  2 Sheets-Sheet 1

WITNESSES:
Robert C. Baird
F. V. Giolma

INVENTORS
James M. Wallace &
Andrew W. Edwards.
BY
Ralph H. Swingle
ATTORNEY

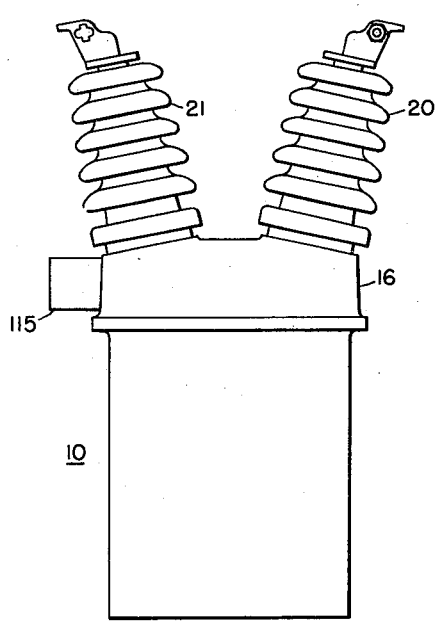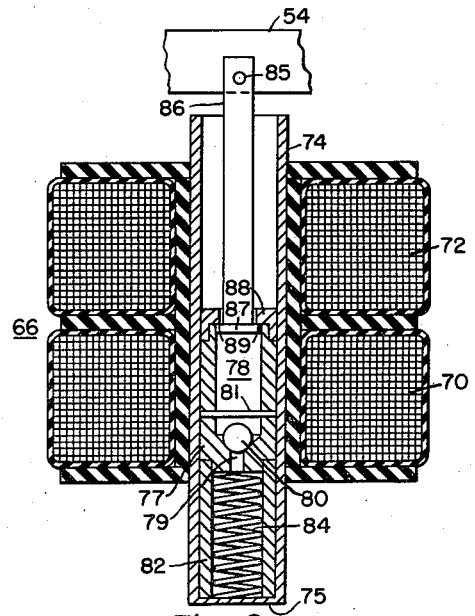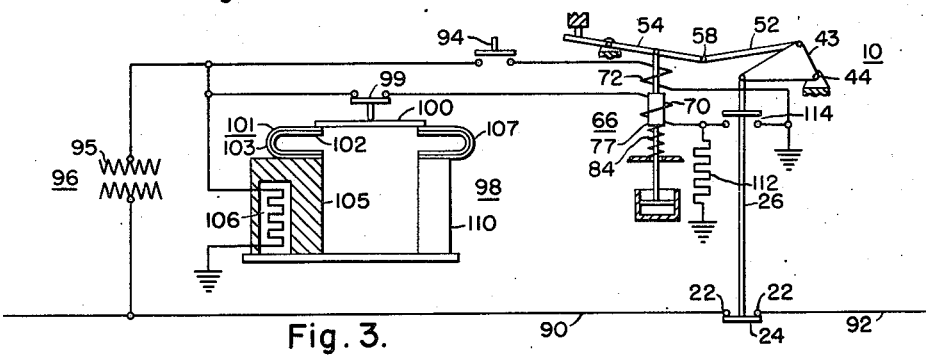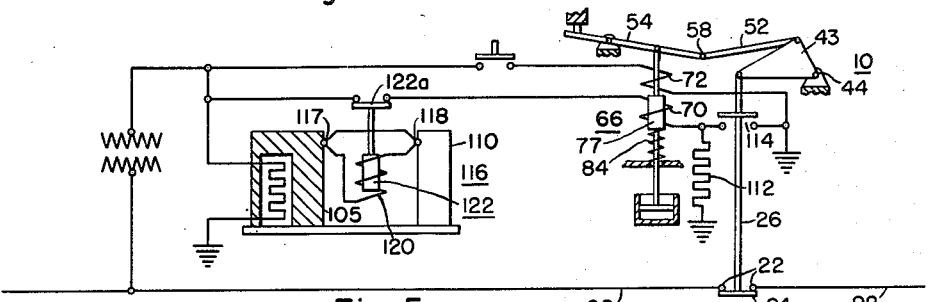

United States Patent Office 2,763,815
Patented Sept. 18, 1956

2,763,815

CIRCUIT INTERRUPTER FOR LOAD PICKUP OPERATION

James Murray Wallace, Pittsburgh, and Andrew W. Edwards, East McKeesport, Pa., assignors to Westinghouse Electric Corporation, East Pittsburgh, Pa., a corporation of Pennsylvania Application December 8, 1951, Serial No. 260,593

10 Claims. (Cl. 317—22)

Our invention relates generally to circuit interrupters and has reference, in particular, to such interrupters as are adapted to sectionalize a distribution line after an outage so as to facilitate re-connecting the load.

Generally, it is desirable to re-connect the load after an outage on a distribution line, but the loss of diversity of load on the average distribution line is a source of trouble in reenergizing the line. Because numerous automatic loads, such as refrigerators, pumps, air conditioners, blowers, etc., which normally are intermittently connected to the line will most likely all be connected and awaiting reenergization of the line after an outage, the inrush current of all the connected loads will be excessive immediately following reenergization and quite likely above the value which the reclosing circuit breaker or other such device that is utilized to restore service can safely carry.

Accordingly, it is one object of our invention to provide a novel load pickup switch that is simple and inexpensive to manufacture, and is also reliable and effective in operation.

Another object of our invention is to provide for modifying a commercial type of electric switch so as to adapt it for automatic load pickup operation.

Yet another object of our invention is to provide in a load pickup switch for tripping the switch a predetermined time after loss of voltage and for delaying reclosing of the switch after voltage is restored in accordance with the duration of the loss of voltage.

It is an important object of our invention to provide in a load pickup switch for using a thermal mass in conjunction with a thermally responsive switch for delaying reclosing of the switch after voltage is restored.

It is also an object of our invention to provide in an automatic load pickup switch for effecting delayed opening of the switch upon loss of voltage and for delaying reclosing of the switch after voltage is restored by means of a temperature-compensated thermal time-delay device.

Other objects will in part be obvious, and will in part be explained hereinafter.

In accordance with our invention, a switch for connecting a load to a power circuit has a toggle lever operating mechanism provided with solenoid operating means for actuating the toggle levers in one direction to close the switch contacts. A spring is used to actuate the mechanism and separate the contacts when the solenoid means is deenergized. An additional solenoid provides for operating the mechanism in the opposite direction to release the toggle levers and separate the contacts. A bimetallic switch in the circuit of the closing solenoid is differentially responsive to the temperature of a mass heated from the circuit and a mass which is at substantially ambient temperature, and delays energization of the closing solenoid for a time after reenergization of the circuit, which time is proportional to the time that voltage has been removed from the circuit.

For a more complete understanding of the nature and scope of our invention, reference may be made to the following detailed description which may be read in connection with the accompanying drawings in which:

Fig. 2 is an enlarged cross-sectional view of the solenoid operating means of the switch shown in Fig. 1;

Fig. 3 is a diagrammatic view showing the circuit connections for the switch shown in Fig. 1 in one embodiment of the invention;

Fig. 4 is a reduced elevational view of the switch taken at substantially right angles to the section shown in Fig. 1; and Fig. 5 is a diagrammatic view showing the circuit connections of the switch shown in Fig. 1, in a modification of the invention.

Figure 1:
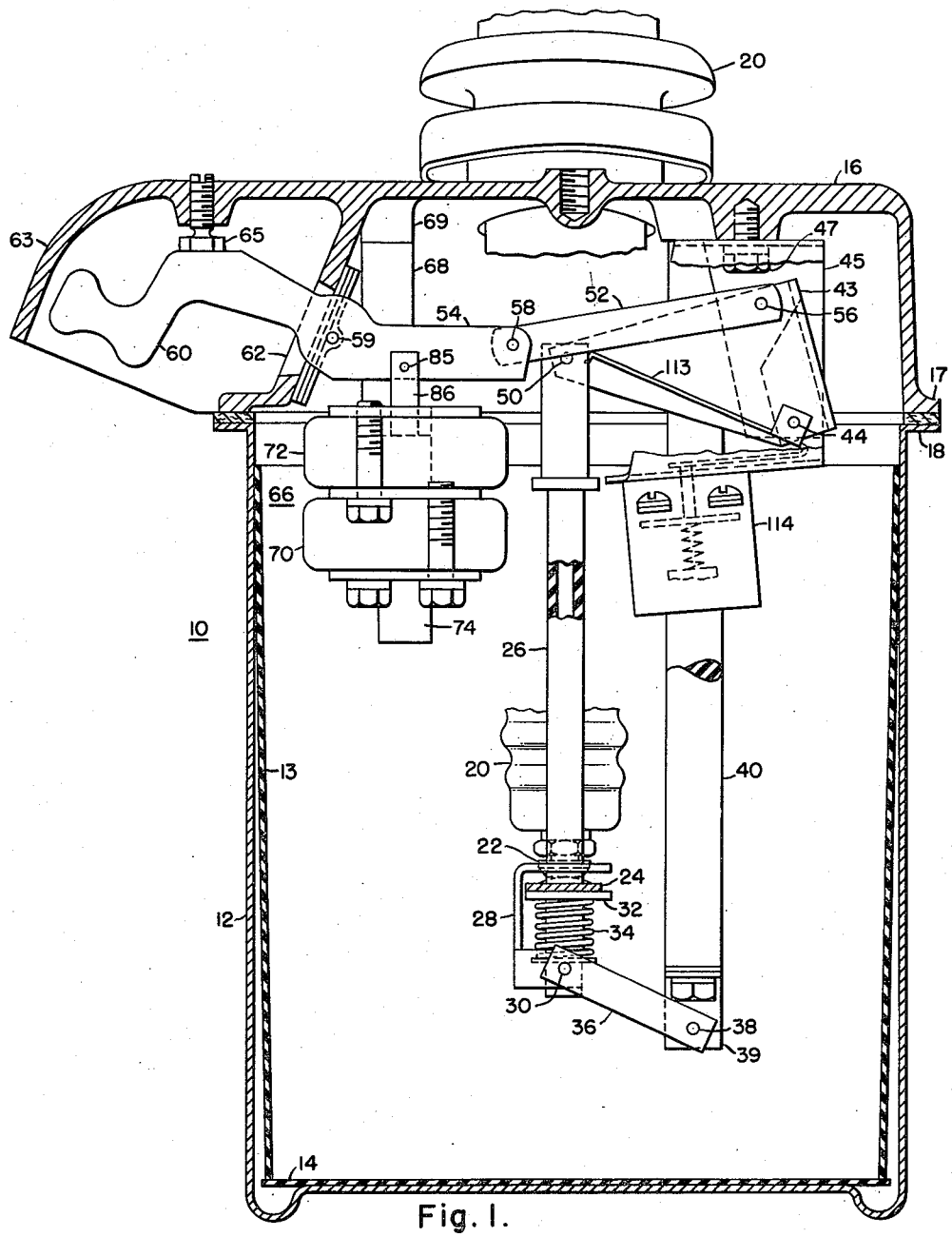
Figure 1 is a substantially central vertical sectional view of a load pickup switch embodying the principal features of our invention.

Referring to Fig. 1, it will be seen that our invention may be embodied in a switch which is generally of the type disclosed in the copending application Serial No. 187,566 of Andrew W Edwards and Alvin W. Ogg, filed September 29, 1950, entitled "Electrically Operated Switches and Sectionalizers," and which is assigned to the assignee of the present invention. According to the disclosure of the above-referred-to application, the switch 10 may be enclosed within a metal tank 12 which is provided with an insulating liner 13 around the sides and an insulating liner 14 at the bottom. The tank is surmounted by a top casting 16 having a peripheral flange 17 which rests upon a peripheral flange 18 about the upper edge of the tank.

An incoming line enters through an insulating bushing 20 which terminates inside the tank. The circuit then continues through a terminal contact 22, which constitutes one of the stationary contacts of the switch. Ordinarily, the switch has two bushings, each with its lead passing through the bushing, and each bushing terminates at its lower end in one of the stationary contacts of the switch, but since Fig. 1 shows a substantially central section through the switch, the second stationary contact and the bushing are not visible (the second bushing 21 is shown in Fig. 4). The terminal contacts may be connected by a movable contact 24 which is shown as a contact bar or bridge which presses up against the underside of the stationary contacts in the closed position of the switch, and which is lowered by gravity upon the release of a pull rod 26, which is shown in the form of an upwardly extending insulating tube. A substantially U-shaped bracket 28 is secured to the pull rod 26 as by a pivot 30, and it assists in locating a contact pressure member 32, which may comprise a bar of magnetic material, such as iron or the like, which is slidably disposed on the pull rod 26 beneath the movable contact 24, being upwardly biased by means of a spring 34 disposed about the pull rod. The lower end of the pull rod may be guided by means of spaced-apart guide links 36 (only one of which is shown), which may be pivotally connected to the pull rod by the pivot 30, and pivotally connected by means of pivots 38 and brackets 39 to insulating supports 40 which depend from the top casting 16.

The operating mechanism for the movable contact 24 is mounted in the top or cover casting, and may comprise a substantially triangular lever 43, which may be pivotally supported as by a pivot 44 in a substantially box-shaped bracket 45 secured to the casting 16 by means of a bolt 47. The lever 43 may be connected to the pull rod 26 as by a pivot 50, and may be releasably maintained in the position shown by means of a pair of toggle levers 52 and 54. The toggle lever 52 may be connected to the lever 43 by means of a pivot 56 and may be connected to the lever 54 by means of a pivot 58. The lever 54 is pivotally mounted on the top casting 16 by a pivot 59, and has a handle portion 60 which projects through an opening 62 in the wall of the top casting into a hood portion 63 from which access may be had to the handle portion from below. An adjustable stop screw 65 locates the handle portion 60 of the lever 54 in an overcenter toggle relation, with the connecting pivot 58 being slightly below a line drawn through the pivots 56 and 59. In this position of the toggle levers, the movable contact 24 will be maintained in contact with the terminal contacts 22 of the switch.

In order to provide for operating the switch 10, solenoid operating means 66 may be provided. The solenoid means 66 may be suitably supported as by an insulating support 68 which may be secured to a projection 69 depending from the top casting 16. As shown in Figs. 1 and 2, the operating means 66 may comprise a closing or operating winding 70 and a trip winding 72. Referring particularly to Fig. 2, it will be seen that these windings may be disposed about a central tube 74, preferably of brass or other such non-magnetic material, having a closed lower end 75. A cylindrical armature 77 may be slidably disposed within the tube 74, having a relatively close fit therewith so as to provide a dashpot action. The armature 77 may be provided with a central bore 78 having an orifice 79 connecting it to the interior of the tube 74 at the lower end. Valve means, such as the ball-check valve 80, may be provided so as to prevent downward flow of a fluid through the orifice 79. A pin 81 extends transversely of the bore 78 above the check valve 80 to retain it in position. Means such as the sleeve 82 may be provided within the tube 74 so as to provide a stop to limit downward motion of the armature in the tube. A spring 84 may be positioned within the sleeve 82 for biasing the armature 77 upwardly when the operating winding 70 is deenergized. The armature 77 may be connected to the lever 54 by means of a link 86 pivotally connected to the lever 54 by a pivot 85 and having an enlarged head 87 slidably disposed within the central bore 78 of the armature. A collar 88 secured to the armature at the upper end has a shoulder 89 which projects inwardly and limits upward movement of the head 87 in the bore.

Accordingly, the closing coil 70 may be energized to rapidly draw the armature 77 downwardly, since the check valve 80 readily passes fluid and is ineffective in this direction, thus drawing the link 86 therewith so as to rotate the toggle lever 54 in a clockwise direction for closing the switch. Upon deenergization of the closing winding 70, the spring 84 urges the armature 77 upwardly, but motion thereof will be delayed by means of the dashpot action since the check valve 80 is effective to block the flow of fluid in this direction. Because of the lost-motion connection between the link 86 and the armature 77, the armature may continue to move upward slowly for three or four minutes until the pin 81 strikes the head 87 of the link 86. Thereupon, the toggle lever 54 will be actuated upwardly to break the toggle connection between the levers 52 and 54 and permit the switch to open by gravity.

Referring to Fig. 3, it will be seen that the switch 10 may be connected in circuit with a distribution line 90, supplying electrical energy to a load circuit conductor 92. The trip coil 72 of the solenoid operating means 66 may be connected to a suitable source of electrical energy, being, for example, connected by means of a trip switch 94 to the secondary winding 95 of a distribution or potential transformer 96 which is energized from the distribution circuit conductor 90.

In order to provide for sectionalizing the conductors 90 and 92 when the circuit may have been deenergized by the opening of a reclosing circuit breaker or the like between the conductors and a source of electrical energy, time delay means 98 may be provided for delaying energization of the closing winding 70 for a predetermined time after reenergization of the conductor 90, so as to overcome the loss of diversity of load on the conductors 90 and 92 during the period of the outage.

The time delay means 98 may comprise a switch element 99 having an actuating member 100. A bimetallic switch operating element 101 may be connected to one end of the member 100. The element 101 may comprise the usual laminated construction of two metals, with the one lamination 102 comprising brass or other such metal having a relatively high coefficient of expansion on the inside of the U-shaped structure, and the other lamination 103 comprising a metal such as iron having a lower coefficient of expansion, so that an increase in temperature will tend to raise the end of the actuating member 100 to which the operating element 101 is connected. For the purpose of providing a time delay for the switch element 99, which is proportional to the duration of loss of voltage, the operating element 101 may be secured to or otherwise connected in heat-conducting relation with a thermal mass 105. The mass 105 may be heated from the conductor 90 by means of a heating element 106, which may be connected to the secondary winding 95 of the transformer 96, and may have a relatively large mass, so as to provide a time delay on the order of 15 to 30 minutes for the switch element 99.

To compensate for changes in the shape of the operating element 101 with changes in ambient temperature, a second operating element 107 may be provided for actuating the other end of the actuating member 100. The element 107 may also be of a bimetallic construction, but unlike the element 101, may have the metal with the greater coefficient of expansion on the outside, so that the end of the actuating member 100 will be depressed with an increase in ambient temperature, to thus offset any tendency for the other end of the operating member to be raised by means of the bimetallic element 101 in response to changes in ambient temperature. The bimetallic element 107 may be secured to a support 110 so as to be subjected to substantially ambient temperature conditions.

In order to provide for a relatively high degree of energization of the closing winding 70, so as to effectively close the switch, without overheating the winding when the switch is closed, means may be provided for reducing the energization of the operating winding when the switch is closed. For example, a resistor 112 may be provided in series with the closing winding 70 when the switch 10 is closed, and suitable switch means 114, which may be operated in accordance with the operation of the switch 10, may be provided for shunting the resistor 112 when the switch is open, and for interrupting such shunt circuit when the switch is closed, so as to effectively insert the resistor 112 in series circuit relation with the operating winding 70 so as to reduce the current therethrough. The switch means 114 may be operated by means of a V-shaped actuator 113 pivotally mounted on the pivot 44 and having one leg actuated by the lever 52 (Fig. 1).

With the switch 10 in the closed or operating position as shown in Figs. 1 and 3, deenergization of the conductor 90 will result in deenergization of the closing winding 70. Accordingly, the spring 84 of the solenoid operating means 66 will slowly move the armature 77 upwardly. Upward motion of the armature 77 is retarded by the dashpot action of the armature in the tube 74, because of the ball check valve 80, so that some time will elapse before the pin 81 strikes the enlarged head 87 of the link 86. When it does, the link 86 will be moved upwardly, thus rotating the toggle lever 54 in a counterclockwise direction so as to raise the common pivot 58 and break the toggle. The lever 43 is thereupon free to rotate in a counterclockwise direction about the pivot 44, permitting the pull rod 26 to drop by gravity and separate contacts 22 and 24.

As soon as the distribution circuit conductor 90 is deenergized, the heater 106 will also be deenergized, so that the thermal mass 105 commences to cool. The end of the contact operating element 100 adjacent the mass 105 is thereupon lowered, opening contact 99. During the outage, the thermal mass 105 cools more and more, thus opening the switch element 99 further and further.

Upon reenergization of the conductor 90, the heater 106 is immediately reenergized and commences to increase the temperature of the thermal mass 105. It will require a time substantially equal to that of the outage before the switch element 99 can be closed by the bimetallic element 101 (this is true for periods up to approximately thirty minutes, which is deemed sufficient time delay in connection with most distribution circuits). Since the switch 10 is open when the conductor 90 is reenergized, the reclosing circuit breaker or other circuit-controlling device which reenergizes the conductor 90 will not have to supply the inrush current for the loads connected to the conductor 92. Accordingly, the inrush current from the connected devices, such as refrigerators, pumps, blowers, air conditioning units and the like, connected to the conductor 90 will not be more than the reclosing circuit breaker can safely handle. Thus, it will be able to maintain the circuit energized.

After the delay afforded by the time delay means 98, the switch element 99 closes, and the closing winding 70 will be energized. Because the switch 114 shunts the resistor 112 when the switch 10 is in the open position, the operating winding 70 will be energized at a maximum value, and the armature 77 of the solenoid operating means 66 will be pulled downwardly very rapidly, thus exerting a relatively high pull on the toggle lever 54 so as to rotate it in a clockwise direction and restore the levers 52 and 54 to the overcenter toggle position shown in Fig. 1. Switch 114 opens when the switch 10 closes, and resistor 112 is connected in circuit with closing winding 70, thus limiting the current through the winding to a value which will not overheat the winding in continuous operation. The switch 10 may be readily tripped by closing the trip switch 94 to energize the trip winding 72. The pull exerted by the trip winding 72 is more than sufficient to overcome that of the closing winding 70, so as to enable the spring 84 to move the armature 77 upwardly with much less than the normal delay and release toggle lever 54 from the closed position.

As shown in Fig. 4, the time delay relay 98 may be mounted in a suitable enclosure 115 secured to the top casting 16, so as to provide an integrated operating system for the switch 10, which may be mounted on a pole top or the like.

Referring to Fig. 5, it may be seen that in another embodiment of the invention the switch 10 may be provided with a solenoid operating means 66 similar to that described in connection with the system shown in Fig. 3, but that the time delay means 116 instead of being of the bimetallic type, as shown in Fig. 3, may comprise thermocouples 117 and 118, which may be connected to respond respectively to the temperature of the mass 105 and that of a point at ambient temperature which may be represented by a support 110, and connected in series opposition to the operating winding 120 of a sensitive relay or switch 122 having a contact member 122a connected in the energizing circuit of the operating winding 70 of the solenoid operating means. The system disclosed in Fig. 5 operates in substantially the same manner as that described in connection with the system shown in Fig. 3 except that the thermoelectric current of the thermocouples 117 and 118 is used instead of the mechanical expansion and contraction of the bimetallic elements 101 and 107 for controlling the energization of the closing or operating winding 70.

From the above description and accompanying drawings, it will be apparent that we have provided in a simple and effective manner for controlling the operation of a switch for effecting automatic pickup of load, following a loss of voltage. Several such switches may be readily used in series relation to segregate a line into a number of sections so as to enable a reclosing circuit breaker or other such switch device ahead of them to be subjected to the inrush currents of only small sections of the line one at a time, thus preventing repeated openings of the circuit breaker due to loss of diversity of load after an outage. A load pickup switch embodying the features of our invention may be simply and economically constructed using commercial switches which are now in production, and our invention is readily applicable to switches of different types which may be already in operation.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. A switch comprising, separable contacts, biasing means effecting delayed separation of said contacts, and voltage responsive means having a movable member operable to one position to provide an operating circuit for closing said contacts and disposed to reset slowly from said position in response to a loss of voltage, said member having an operating time equal to the reset interval within a range of thirty minutes to provide for effecting closing of said contacts a variable time after restoration of voltage, which time is greater than the separating time and is proportional to the time the switch has been open.

2. In a switch, separable contacts biased to separate, an operating mechanism for said contacts including releasable means maintaining said contacts closed against said bias to maintain an electric circuit, electroresponsive means operable to close said contacts including biasing means operable a predetermined time after loss of voltage to effect release of said releasable means for opening said contacts, and means energized while the contacts are closed and having a delayed reset time when voltage is removed from the circuit delaying reclosing of said contacts for a predetermined variable time after restoration of voltage dependent on the time voltage is removed.

3. A load pickup switch comprising, separable contacts, an operating mechanism for opening and closing said contacts including a pair of toggle levers operable to a releasable overcenter position to effect engagement of said contacts and maintain them in engagement, biasing means having a lost motion connection with one of said levers actuating said one of said levers to an undercenter position to release said levers from said releasable position, electroresponsive means operable upon application of voltage to the switch to actuate said levers to said releasable position and maintain them there against the bias of said biasing means, and time delay means having a delayed reset time operable to delay energization of said electroresponsive means for a variable time after application of voltage to said switch which time is proportional to the time during which voltage is removed from the electroresponsive means.

4. In a switch, separable contacts, an operating mechanism including a pair of pivotally connected levers arranged in overcenter toggle relation to open and close said contacts and releasably maintain them closed, biasing means actuating one of said levers to a released undercenter position to permit separation of said contacts, electroresponsive means having an armature and a winding for effecting actuation of said pair of levers to the releasable position and opposing action of the biasing means, delay means opposing operation of the biasing means to separate the contact, said electroresponsive means also having a winding for assisting the biasing means and effecting operation of said levers to separate said contacts, and thermal time delay means having a delayed reset time operable in response to a loss of voltage to delay operation of said mechanism for a variable time after voltage is applied to the switch, said time being greater than the delay time of the delay means.

5. A switch comprising, separable contacts, an operating mechanism therefor including releasable lever means closing the contacts and maintaining them closed, electroresponsive means operating the switch including an armature having a lost motion connection with said lever means, biasing means urging the armature to effect release of said lever means to separate the contacts, delay means restraining movement of the armature by the biasing means solenoid means actuating the armature against the action of the biasing means and maintaining it in a position with the lever means in said releasable position, and delay means having a delayed reset time operable to measure the time voltage is removed and delay energization of the solenoid means for the time measured after voltage is restored.

6. In a circuit interrupter, separable contacts, solenoid means having an armature with a lost-motion connection for effecting engagement of said contacts, biasing means for effecting separation of said contacts upon loss of voltage in the circuit, and relay means for delaying energization of said solenoid for a variable interval after restoration of voltage to the circuit dependent upon the duration of loss of voltage, said relay means having a thermally responsive bimetallic switch element with heating means and a thermal mass for controlling operation thereof disposed to be connected to be heated from the circuit.

7. A load pickup device for a load circuit comprising, separable contacts, an operating mechanism for separating and closing said contacts including a pair of toggle members operable to a releasable overcenter position to close said contacts and hold them closed, electroresponsive means for actuating one of the levers to move them to said releasable position, biasing means for actuating one of said levers to release them from the releasable position upon deenergization of the electroresponsive means, and thermal switch means including a bimetallic switch element for disconnecting the electroresponsive means and re-connecting it to the load circuit, heating means disposed to be energized from the load circuit, and a thermal mass disposed to be heated by said heating means for effecting operation of said switch element.

8. In a load pickup switch for a load circuit, separable contacts, electroresponsive means for closing said contacts and maintaining them closed, means for opening said contacts upon loss of voltage, means delaying opening of said contacts no more than 3 to 4 minutes, temperature-responsive switch means, for delaying energization of said electroresponsive means for up to 30 minutes after application of voltage, said switch means including a thermal mass connected to control operation of the switch means, heating means for heating the thermal mass when the load circuit is energized, and an additional thermal mass connected to compensate the switch means for changes in ambient temperature.

9. In a load pickup switch for a circuit, separable contacts, electroresponsive means for closing said contacts and maintaining them closed, biasing means for effecting opening of said contacts upon deenergization of the circuit, time delay means delaying opening of said contacts, and additional time delay means for delaying energization of the electroresponsive means for a predetermined time after energization of the circuit, said time delay means comprising a switch device connecting the electroresponsive means to the circuit, a thermal mass disposed to be heated from the circuit, an additional thermal mass disposed at substantially ambient temperature, and thermocouple means responsive to the temperatures of said masses connected in series opposition to operate the switch device when the temperature of the mass heated from the circuit reaches a predetermined temperature above the ambient temperature.

10. A switch comprising, separable contacts, an operating mechanism for actuating one of said contacts including a pair of levers operable to an overcenter toggle position to close said contacts and releasable therefrom to an undercenter position separate the contacts, electroresponsive means for operating said mechanism including a tube closed at one end, an armature slidably disposed in said tube with a relatively close fit to provide a dashpot action, valve means for restricting passage of a fluid through said armature, lost-motion means connecting the armature to one of said levers for actuating it to move said levers to said toggle position, spring means biasing said armature to move said levers to an undercenter position and release said levers from said toggle position, a solenoid winding for actuating the armature to close said contacts and hold them closed against the spring means, and an additional solenoid winding for actuating the armature to release said levers from said toggle position, and time delay means having a delayed reset time measured from the time of loss of voltage delaying energization of the closing solenoid until a predetermined variable time after application of voltage which is responsive to the duration of loss of voltage within a predetermined range.

References Cited in the file of this patent

UNITED STATES PATENTS

| 1,023,377 | Hawkins | Apr. 16, 1912 |
|---|---|---|
| 1,272,444 | Holliday | July 16, 1918 |
| 1,272,447 | Jacobs | July 16, 1918 |
| 1,747,096 | White | Feb. 11, 1930 |
| 1,795,198 | Connell | Mar. 3, 1931 |
| 2,068,620 | Spurgeon | Jan. 19, 1937 |
| 2,069,625 | Rich | Feb. 2, 1937 |
| 2,449,224 | Hegeman et al. | Sept. 14, 1948 |
| 2,468,308 | Schwartz | Apr. 26, 1949 |
| 2,497,684 | Ogden | Feb. 14, 1950 |
| 2,575,740 | Warrington | Nov. 20, 1951 |
| 2,654,053 | Wallace et al. | Sept. 29, 1953 |

FOREIGN PATENTS

| 232,579 | Great Britain | Mar. 31, 1925 |